Butler

[11] 4,381,512
[45] Apr. 26, 1983

[54] CONTROLLER FOR PEN, PAPER AND CHART OF A RECORDER

[75] Inventor: Keith C. Butler, Newark, Del.

[73] Assignee: Hewlett-Packard Company, Palo Alto, Calif.

[21] Appl. No.: 11,738

[22] Filed: Feb. 13, 1979

[51] Int. Cl.³ .............................................. G01D 9/10
[52] U.S. Cl. .................. 346/33 R; 346/136; 346/139 R; 364/520
[58] Field of Search ............ 346/33 R, 33 A, 29, 346/136, 139 R; 364/520, 518, 497, 498, 499

[56] References Cited

U.S. PATENT DOCUMENTS

| 3,425,038 | 1/1969 | Trousdale | 364/520 X |
| 3,603,770 | 9/1971 | Reins | 364/520 |
| 3,662,380 | 5/1972 | Cargile | 340/347 AD |
| 3,887,796 | 6/1975 | Trousdale et al. | 364/520 X |
| 3,986,011 | 10/1976 | Poole | 364/518 |

Primary Examiner—Joseph W. Hartary
Attorney, Agent, or Firm—Donald N. Timbie

[57] ABSTRACT

Apparatus for controlling the stepping of a pen and chart of a recorder is described in which the data is buffered so as to free up the processor. The pen steps as fast as it can and no new data points are read until the pen-stepping data is used up. The chart stepping is keyed to the reading of data points so that while the pen is moving to a desired position, the chart stands still.

3 Claims, 2 Drawing Figures

CONTROLLER FOR PEN, PAPER AND CHART OF A RECORDER

BACKGROUND OF THE INVENTION

In a typical recorder, paper is moved with constant velocity in one direction so as to represent an independent variable such as time, and a stylus is moved across the paper in an orthorgonal direction in accordance with the amplitude of a signal representing a dependent variable. Certain signals, such as those appearing at the output of the detector of a chromatograph, exhibit changes in amplitude that are rapid at some times and slow at others. Recording such signals with fidelity requires that the stylus be able to move with sufficient speed to follow the most rapid changes in amplitude. Furthermore, if annotation or other messages are to be recorded along with the signal, the stylus must be able to move faster than required by the signal in order to have some free time in which to perform this function. A mechanism for driving the stylus with sufficient speed to record the signal faithfully and at the same time permit the writing of annotations is expensive.

BRIEF DISCUSSION OF THE INVENTION

With this invention, the speed at which the stylus can move is not critical so that a faithful recording and annotations can be made with an inexpensive mechanism. This is accomplished by placing the signal data and messages in a buffer and drawing them from the buffer to drive the stylus and to modulate the speed of the paper so that the speed of the stylus can remain below its limit. Thus, in recording the signals provided by the detector of a chromatograph, tall fast peaks are recorded more slowly than they are generated, and short slow peaks are recorded faster than they are generated. This allows the recorder to catch up so that, on the average, the signal is recorded as fast as it is generated. The number of successive fast peaks that can be generated depends only on the capacity of the buffer.

DESCRIPTION OF THE INVENTION

Figure 1:
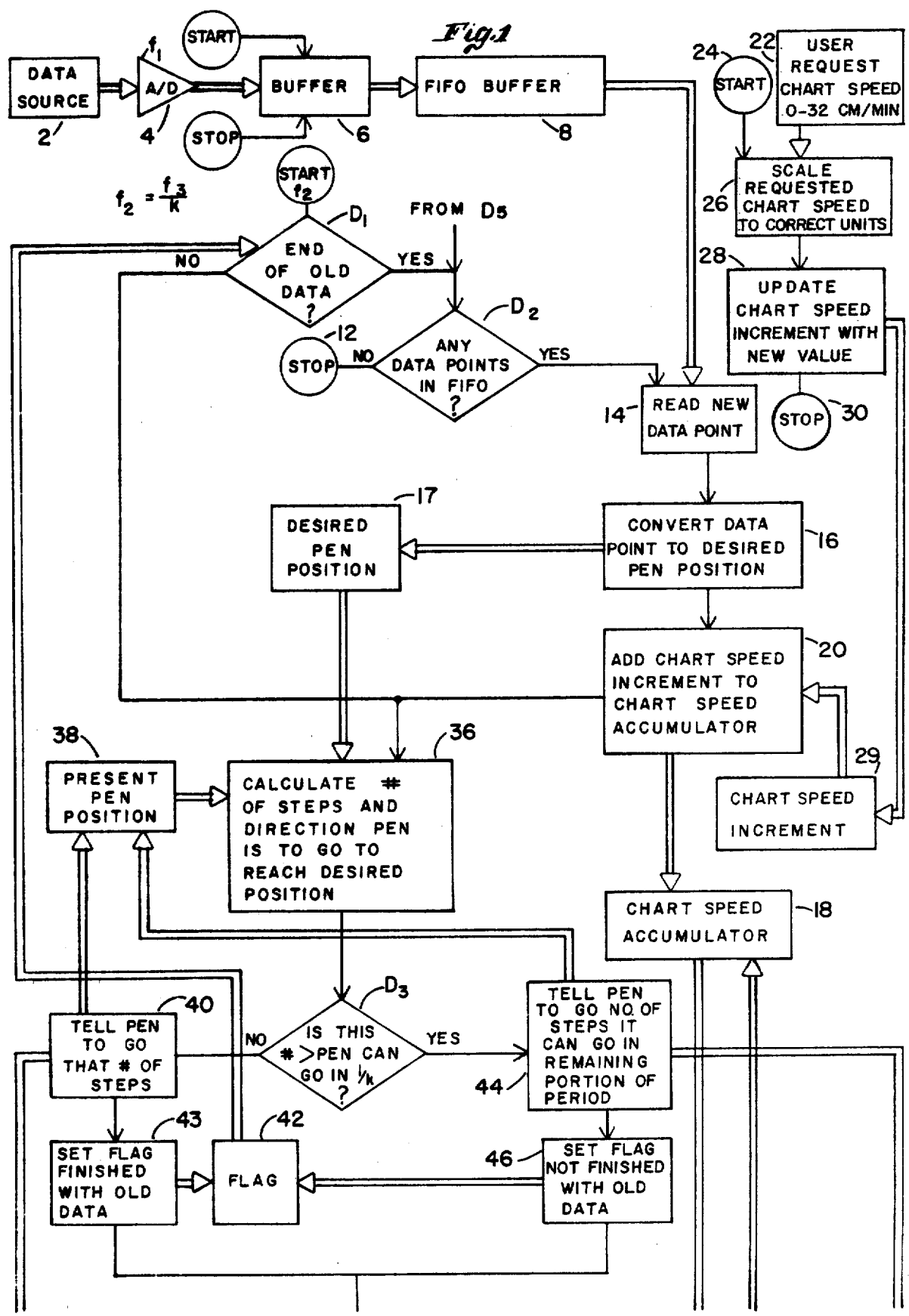
FIGS. 1 and 2 combined illustrate an embodiment of this invention.
Figure 2:
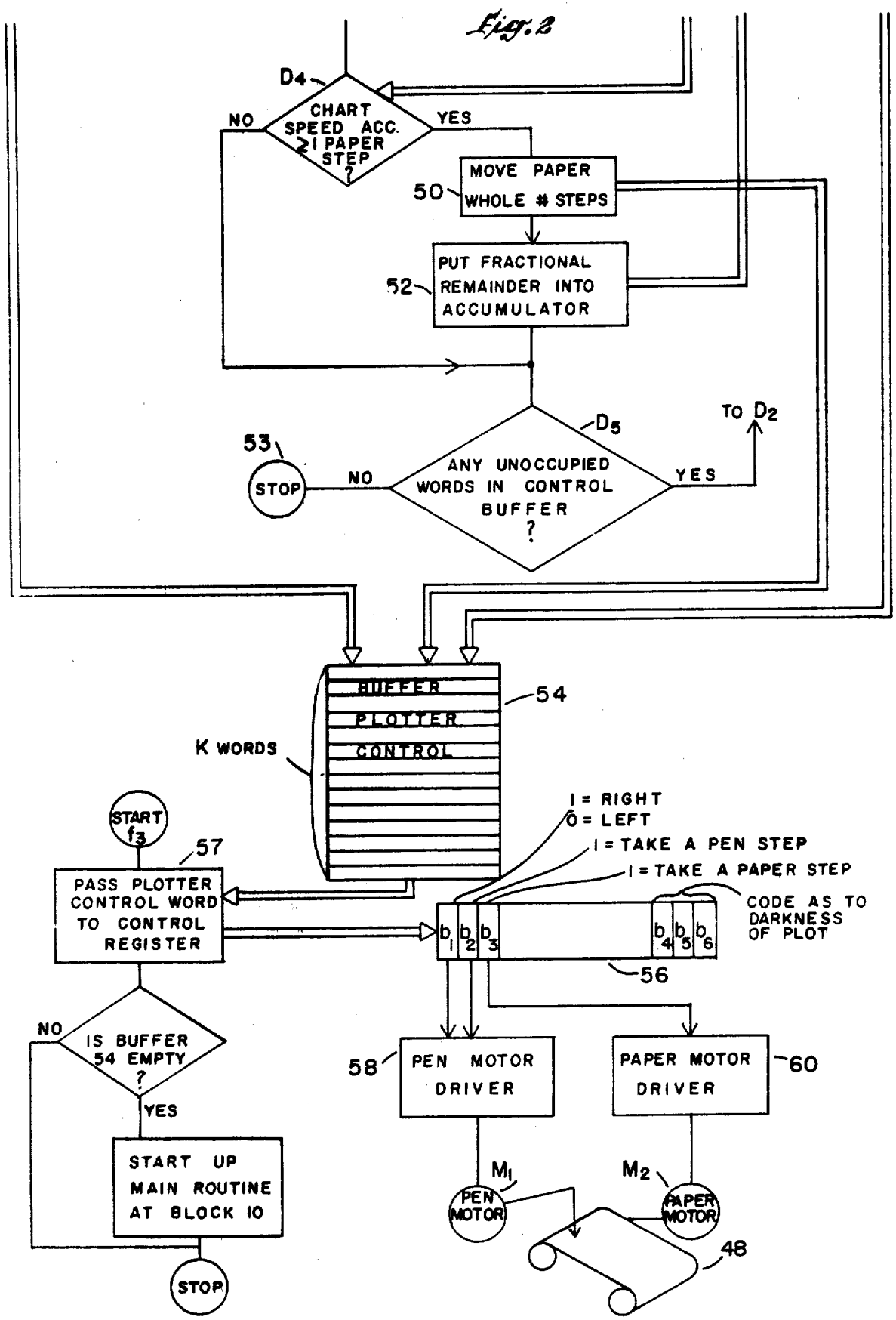

Analog data to be plotted by the pen is provided by a source 2, which may be a detector of a chromatograph, and is converted to digital form at a rate $f_1$, which may be every 40th of a second, by an A/D converter 4 and stored in a buffer 6 before being applied to a fifo buffer 8. This data is used to control the stepping of a pen motor $M_1$ and the stepping of a paper motor $M_2$ shown in FIG. 2. In accordance with the routine to be described, old data is used up before new data is withdrawn from the fifo buffer 8.

The routine is initiated at a frequency $f_2$, which may be every 34th of a second. Whether or not the old data has been used up is made by a decision $D_1$ from information provided at a later point in a manner to be described. If the answer is yes, as would be the case at start-up, another decision $D_2$ is made as to whether any more data is stored in the fifo buffer 8. If not, the routine stops, block 12, until initiated again $1/f_2$ seconds later.

For various reasons, it may not be desired to move the pen to the position indicated by the data point. For example, it might be desired to subtract data obtained when no sample is being supplied to the detector in order to establish a better baseline, or it may be desirable to add a fixed amount so as to bring the baseline to a central position on the paper in order to examine baseline noise. It might also be desired to clip the data at a certain amplitude to permit magnification of the display of lower amplitudes, or it may be decided that all data should be attenuated so that even the highest peaks appear in the plot. After any such modification, as indicated at block 16, the value of the data point is transferred to a latch 17 where it is held until a new data point for a new pen position is received.

As each data point is withdrawn from the fifo buffer 8, an incremental count corresponding to the fraction of a step, which may be greater or less than unity, that the paper motor $M_2$ is to move is added to a count in an accumator 18, as indicated at block 20. Inasmuch as the user may wish to specify a wide range of paper speeds, the incremental count can be varied by the following subroutine. When the user types in a desired chart speed, e.g., from 0 to 32 cm/min, as indicated at block 22, the subroutine is started, as indicated at 24. Inasmuch as the speed in centimeters cannot be used directly, it is put into proper units, as indicated at block 26. The chart speed increments are then updated, block 28, and put into a latch 29. The subroutine is then terminated, as indicated at 30.

Returning now to the main routine, whenever a new pen position is determined at block 16, it is stored in the latch 17. If the data previously drawn from the fifo buffer 8 has not been used up, the decision $D_1$ is negative so that no new data is drawn from the buffer. A calculation is made, block 36, as to the number of steps the pen has to go before it reaches the desired position. Information as to the present pen position is derived from latch 38, which receives its information in a manner to be explained.

Whether the old data has not been used up or new data is available, a decision $D_3$ is made as to whether the pen must move more steps to reach the position stored in the latch 17 than the pen can move in the current $1/f_2$ seconds. If not, the pen is instructed, block 40, to move the number of steps required to reach the desired position. A flag 42 is set, block 43, indicating that the routine is finished with the old data. If, on the other hand, the number of steps required to reach the desired position in the latch 17 is greater than the pen can move in the remaining portion of the $1/f_2$ second period, the decision $D_3$ is affirmative and, as indicated at the block 44, the pen will be instructed to go the number of steps that it can go in this time. The flag 42 is set, block 46, indicating that the pen has not been instructed to move all the way to the desired position. The instructions given at blocks 40 and 44 also include the direction in which the pen is to move.

When the pen is instructed to move a number of steps, block 40 or block 44, it is assumed that the instruction will be carried out. Therefore, the present position of the pen, block 38, can be updated by the block 40 or the block 44.

Now consider the motion of the chart 48. Inasmuch as the chart motor $M_2$ cannot advance less than one step, a decision $D_4$ is made as to whether the count in the chart speed accumulator 18 is greater than that required for one paper step, which is unity. If not, the paper motor $M_2$ receives no instruction until the count is $\geq 1$. When this occurs, the instruction is given, block 50, to move any whole number of steps in the accumulator 18 providing this number of steps does not exceed the number of vacant words in the control buffer 54. The details for making this decision are not shown but are similar to the way in which pen steps were handled by $D_3$ and the blocks 40 and 44. If the number of whole steps is greater than the number of vacant words, the block 50 only provides a number of words equal to the difference; the remainder can be put back into the accumulator 18. It should be understood that the words for each paper step or non-step provided by the block 50 occur at the same time as the words representing pen steps or non-steps that are provided by the block 44 so that they, in effect, are part of the same composite word stored in the control buffer 54. Any fraction left over is put back into the accumulator 18 as indicated at the block 52.

There is no point in proceeding with the routine if, as indicated by $D_5$, both pen and paper motors $M_1$ and $M_2$ cannot move any farther in the remaining portion of the period $1/f_2$ seconds, so the routine is stopped, as indicated at 53. If, on the other hand, both pen and paper can move farther, $D_5$ is affirmative and so the routine returns to $D_2$ to see if there is any more data. The entire routine is restarted $f_2$ times a second.

Motor Control

When the pen is commanded to move the number of steps to reach a desired position, block 40, or to go the maximum number that it can go, block 44, the digital words provided not only indicate the number of steps but the direction as well. The paper, however, can only move in one direction so that it need only be told to step or not, block 50, without being given a direction. These words are combined in the control buffer 54 so as to form a composite control word. The motors $M_1$ and $M_2$ can be stepped $f_3$ times a second, and the control buffer can hold K words. The words are supplied to a control register 56 by block 57 from the buffer 54 $f_3$ times a second. Various combinations of bits are possible in the code word, but the bits may be assigned meanings as indicated wherein the first bit $b_1$ determines the direction that the drive 58 is to make the motor $M_1$ go; the second bit $b_2$ indicates whether the motor $M_1$ is to move one step; and the third bit $b_3$ indicates whether the drive 60 is to cause the motor $M_2$ to advance one step. Other bits can be used for other purposes. For example, although not described, it may desirable, if the pen is a hot wire stylus, to increase its temperature as the pen moves faster, thereby causing it to burn a line on the paper having uniform darkness. Eight different temperature levels could be provided by various combinations of the bits $b_4$, $b_5$ and $b_6$.

As the words are being transferred from the control buffer 54 to the register 56, a decision $D_6$ is made as to whether the control buffer is empty. If it is, the main routine described above is started, block 62. After this is done, or if the control buffer 54 has some words in it, this subroutine stops, as indicated at 64.

Overall Operation

Digital words representing the amplitude of the signal from the source 2 are inserted into the fifo buffer 8 at a rate $f_1$.

The main routine is started at a rate $f_2$, as indicated at block 10, but runs at processor speed in performing the following functions. When a data point is read from the buffer by block 14, it is converted into a desired pen position at block 16, and this position is inserted in the latch 17. The latch 38 contains information as to the present position of the pen that is updated in a manner to be explained. From the information in the latches 17 and 38, the calibrator calculates at block 36 the direction and the number of steps that the stepping pen motor $M_1$ must take in order to reach the desired position. Each instruction to move one step is contained in a separate word stored in the control buffer 54. Therefore, the pen cannot be instructed to move more steps than the vacant words in the buffer 54. If the number of steps the pen must move to reach a desired position is greater than the number of vacant words, $D_3$, a number of words equal to the number of vacant words is sent to the control buffer 54 by the block 44, and a flag is set indicating that the old data has not been used up. The words sent to the control buffer 54 also update the present position in the latch 38. If the number of pen steps required to go from this new position to the desired position is still greater than the number of vacant words in the control buffer 54, an affirmative answer from $D_3$, the process is repeated until the number of steps is equal to or less than the number of vacant words. At this point, $D_3$ provides a negative answer and words for these steps are sent to the control buffer 54 and are used to update the present pen position, latch 38. In addition, a flag is set, block 42, indicating that all the old data is used up. The decision $D_1$ now yields an affirmative answer, and if there are any data points in the fifo buffer 8, decision $D_2$, a new data point is read, block 14. If no more data points are in the buffer, the routine stops so as not to keep trying to read out nonexistent data points and use up processor time needlessly.

Motion of the chart is keyed to the reading out of new data points. If none are read out, the chart stands still, but when a point is read, regardless of the number of pen steps it requires, a given fraction is taken from the chart speed increment memory 29 and inserted into the chart speed accumulator 18. As previously described, the greater the chart speed selected by the user, block 22, the larger is the fraction that is on the memory 29.

If the total number in the accumulator 18 is greater than or equal to unity, the amount required to make the paper advance one step, words commanding the paper to move the whole number of steps are placed in the control buffer 54, as indicated at block 50. Any fraction left over is put back into the accumulator 18. After this, a decision $D_5$ is made as to whether there are any unoccupied words in the control buffer 54. If so, the routine returns to $D_2$; and it not, the routine stops.

The function of the control buffer 54 is to provide for the difference in the steady rate $f_3$ at which words are pulled from it by the block 57 and the varying rate at which words may be put into it because of the fact that the processor may be assigned other tasks. But for this, it would be possible to design a system without the control buffer 54.

What is claimed is:

1. Apparatus for moving the pen and chart of a recorder in such manner that data which changes faster than the pen can follow may be recorded with fidelity, comprising means for buffering data points representing the amplitude of the data to be recorded at successive time intervals, means for reading data points from said buffer, means for forming signals for moving a pen from a position corresponding to a previous data point to a position corresponding to the current data point at speeds up to and including its maximum, means for causing said means for reading data points to read a new data point whenever signals have been given to the pen that are necessary for it to move to the current data point, and means for controlling the advance of the chart in response to the reading of a new data point.

2. Apparatus for controlling the stepping motion of the pen and chart of a recorder, comprising a data input to which analog data to be recorded can be applied, an analog-to-digital converter having an input coupled to said data input and having an output, a fifo buffer having an input coupled to the output of said converter and having an output, a control buffer for storing a given number of words, means for reading data as to a desired pen position from said fifo buffer, means responsive to the words read from said buffer for determining the number of steps the pen has to go to reach the desired position, means forming a word for each step and transferring the number of words equal to the vacant words in said control buffer into said control buffer, means for causing said means for reading from said control buffer to read a new word from said fifo buffer when all the words representing steps of the pen motor have been transferred to said control buffer, an accumulator, means responsive to a reading of a new data point from said fifo buffer for depositing a given count into said accumulator, means for forming words for each whole step indicated by the count in said accumulator and transferring them to the control buffer, as long as there are any vacant words in said buffer, a register, means for transferring words from said control buffer, and means for controlling pen and drive motion in response to words in said register.

3. Apparatus for deriving control signals for controlling the stepping of a pen and a chart of a recorder so as to faithfully record an analog signal that may vary in amplitude at speeds that cannot be followed by the pen, comprising an analog-to-digital converter to which the analog signal may be applied so as to derive digital data points, a fifo buffer coupled to receive words from the output of said converter, means for reading words from said fifo buffer, a control buffer for storing words having bits for respectively causing single steps to be taken by a pen motor and a chart motor, means for determining from the words read from said fifo buffer the number of steps which the pen must take in response to the word, means for forming a step word for each of said steps and transferring them to vacant words in said control buffer as the vacant words become available.

means for causing said reading means to draw a new data point from said fifo buffer when all said step words have been transferred to said control buffer, means for controlling the formation of step words for the chart in response to each reading of a data point from said fifo buffer, means for transferring said chart step words to said control buffer, a register, and means for translating the words in said control buffer into said register.

* * * * *